R. ALLEN.
PISTON OR PISTON VALVE.
APPLICATION FILED NOV. 15, 1911.
1,335,951.
Patented Apr. 6, 1920.
5 SHEETS—SHEET 1.
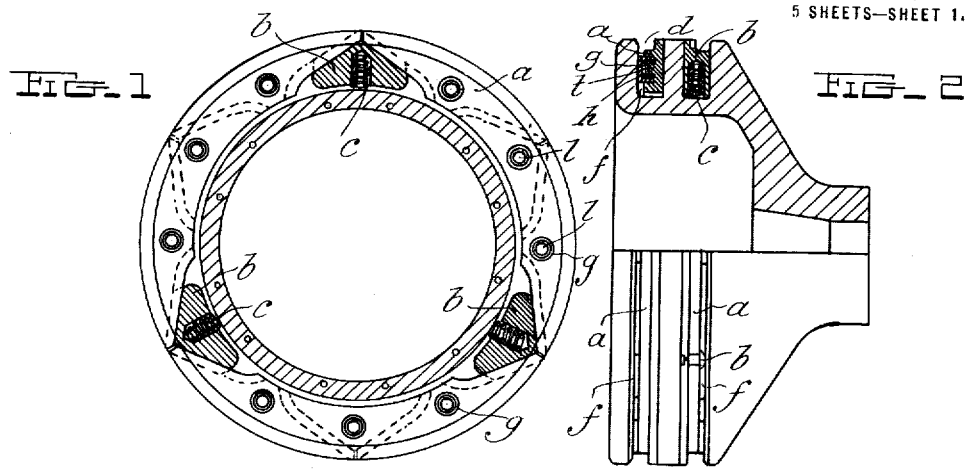
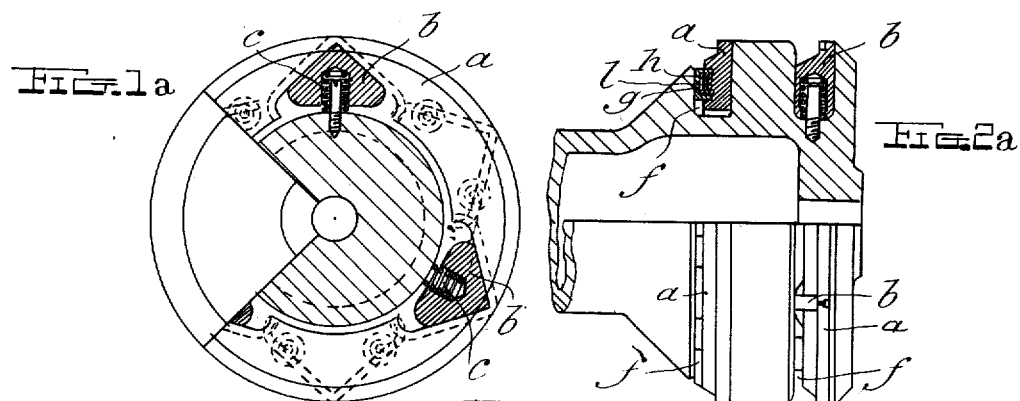
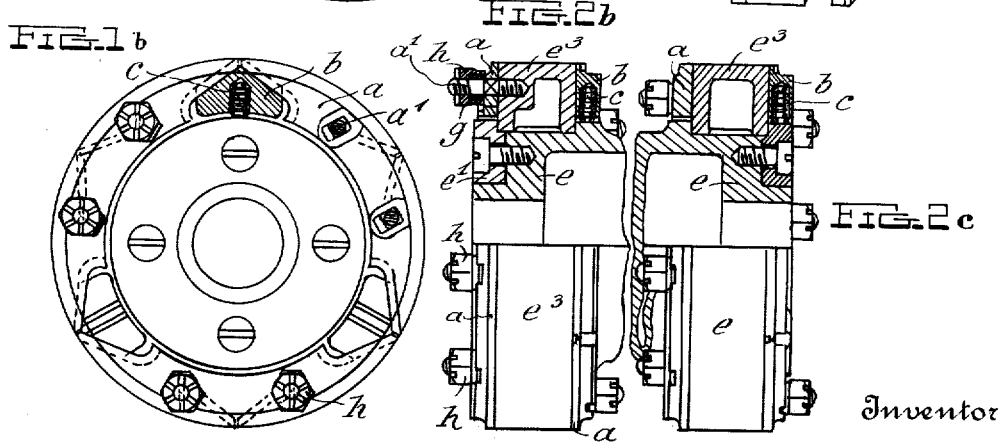
Witness
George W. Giovannetti
Inventor
R. Allen
By H. B. Willson & Co.
Attorneys

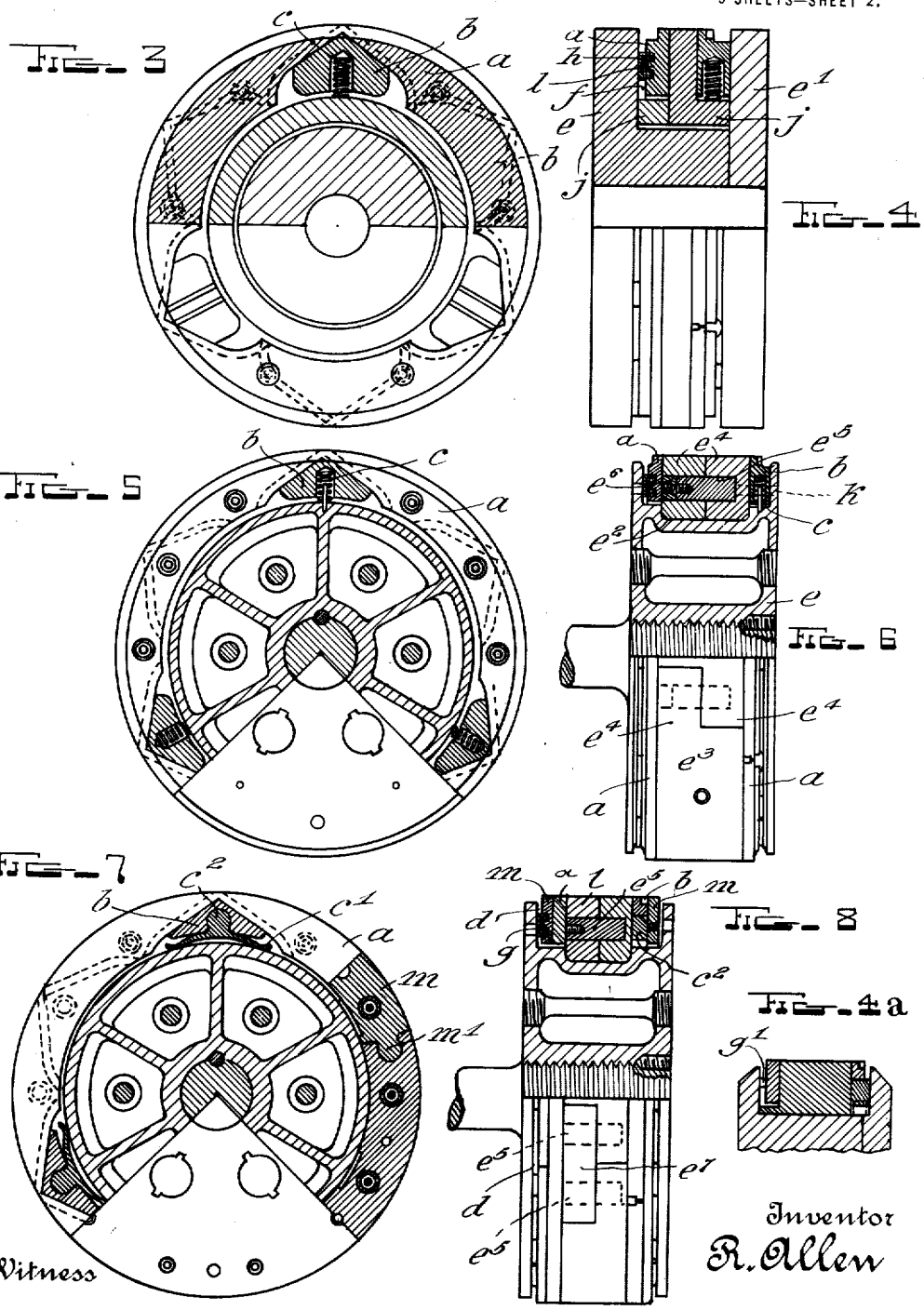

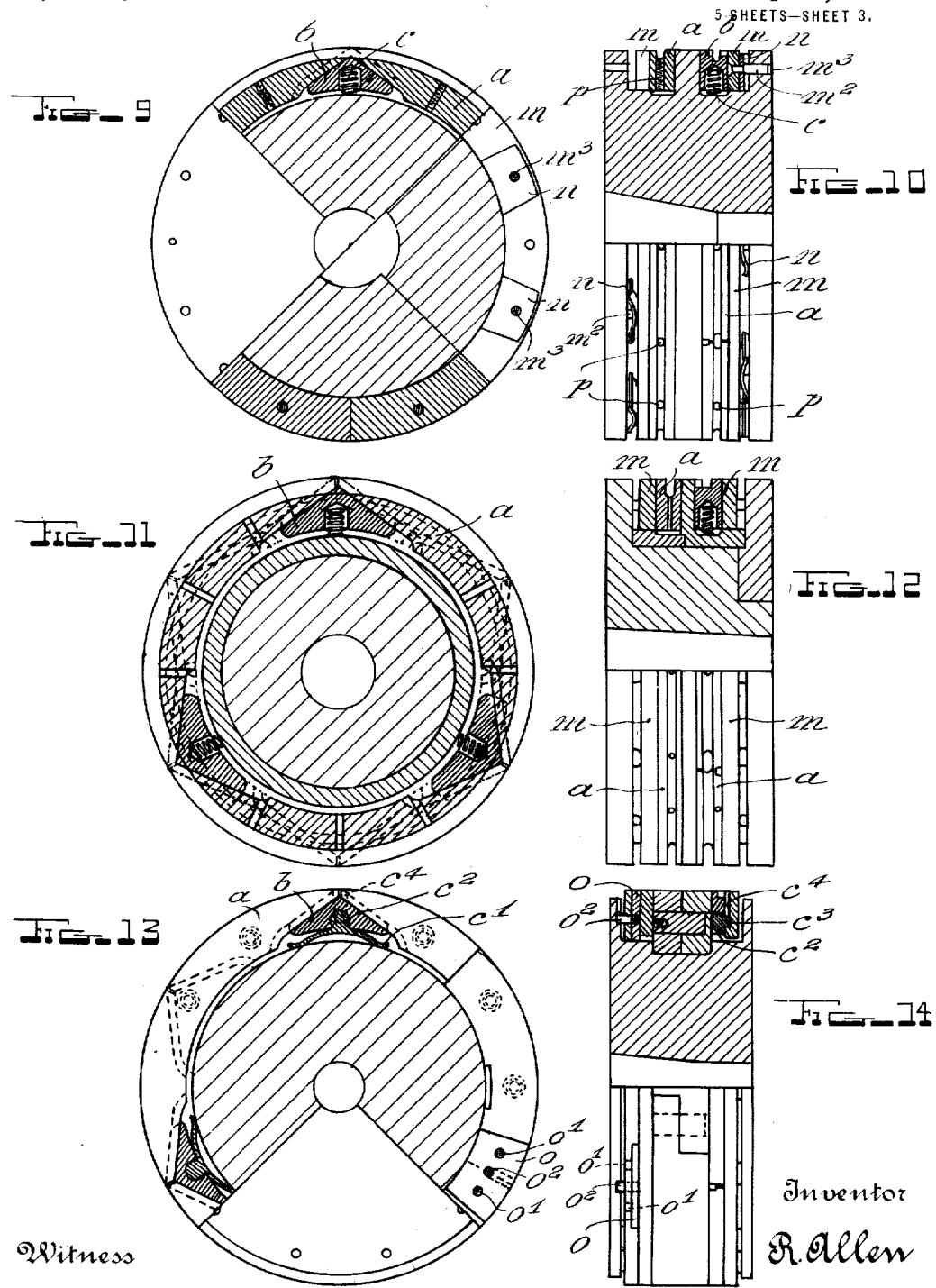

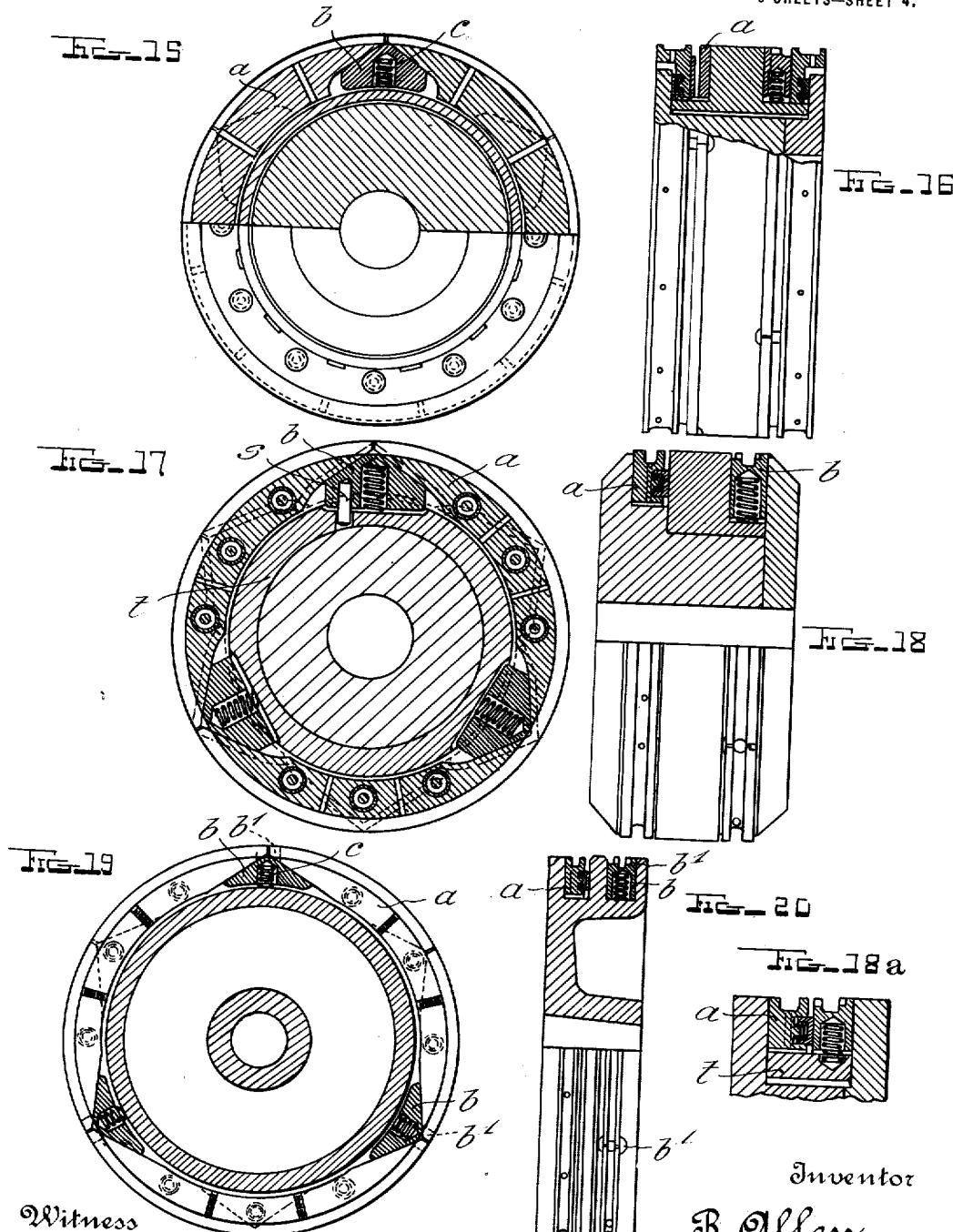

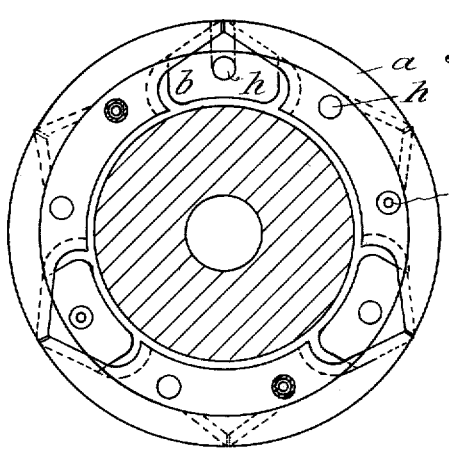
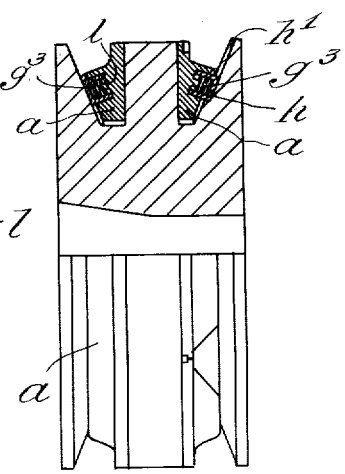
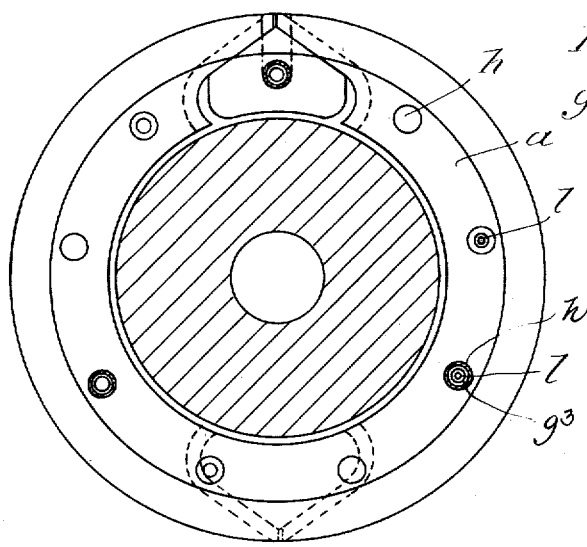
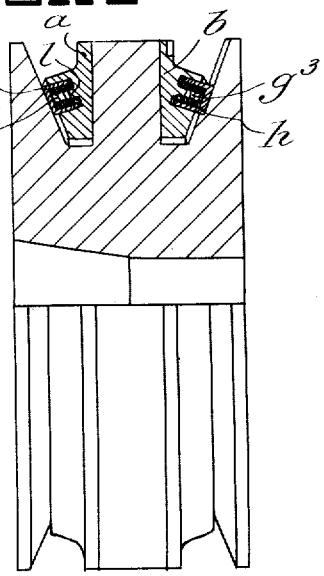

UNITED STATES PATENT OFFICE.

ROBERT ALLEN, OF CAVERSHAM, ENGLAND.

PISTON OR PISTON-VALVE.

1,335,951.   Specification of Letters Patent.   Patented Apr. 6, 1920.

Application filed November 15, 1911. Serial No. 660,502.

*To all whom it may concern:*

Be it known that I, ROBERT ALLEN, a subject of the King of Great Britain and Ireland, residing at "Lynwood," Kidmore Road, Caversham, Oxfordshire, England, have invented certain new and useful Improvements in Pistons or Piston-Valves, of which the following is a specification.

It is well known that with many types of pistons the steam or other pressure fluid by getting behind the packing rings and expanding them with great force against the cylinder walls causes both loss of power and rapid wearing away of the packing rings and cylinder.

One object of this invention is to minimize or entirely neutralize or control the expanding effort of the steam or other pressure medium, should such pressure medium obtain access to the space between the packing ring and the bottom of the groove in the body of the piston.

Another object is to provide for a more convenient and effective application of spring pressure to the packing rings whereby they can be expanded and pressed against one side of their grooves by the same set of springs.

Other objects of the invention are to enable the wearing parts of the piston to be readily renewed without renewing the whole piston head, the provision of means for preventing the clogging of the packing by solid matters when used in internal combustion engines, and the improvement of certain details in the spring expanding devices used with the packing.

In the practice of my invention, the pressure medium itself is utilized to hold the packing ring against the undesirable expansion hereinbefore referred to, for which purpose the steam or other pressure fluid is admitted freely to the side of the packing ring, or to one side of an inextensible follower ring in the packing ring groove, which is adapted to grip the packing ring under the action of the pressure medium.

In order to enable the same set of springs to be used both for expanding the packing rings and holding them against one side of their grooves, the springs are so mounted in the side of the packing ring groove that the force exerted by them is divided into radial and axial components.

This arrangement also enables strong springs to be used without any undesirable increase in the expanding force on the piston rings, and further no space is required at the bottom of the packing ring grooves for housing the springs so that the springs can be applied to pistons or valves where such space is not available.

In addition, especially in the case of locomotive pistons a renewable tread or wearing ring formed in two parts is fixed on the solid piston head, and enables the piston head to be permanently fixed on the rod, the tread only requiring renewal from time to time.

In the case of internal combustion engine pistons an improved intercepter ring is fitted in the head for preventing carbonized particles or other solid matters getting to the packing rings, such intercepter being made in two parts to enable it to be got into position on a solid head. Other improved details are described hereinafter.

Referring to the accompanying drawings.

Figures 1 and 2 are transverse section and sectional side elevation respectively of a piston provided with a packing constructed according to this invention.

Figs. 1$^a$ and 2$^a$ are similar views to Figs. 1 and 2 showing a slightly modified arrangement of the packing.

Figs. 1$^b$ and 2$^b$ are similar views to Figs. 1 and 2 showing packing rings mounted on guide studs.

Fig. 2$^c$ shows a view similar to Fig. 2$^b$ with parts broken out.

Figs. 3 and 4 are similar views to Figs. 1 and 2 showing a slightly modified form of construction.

Fig. 4$^a$ is a section of a further modified construction.

Figs. 5 and 6 are elevations partly in section taken at right angles through a piston fitted with the improved packing and the renewable tread ring.

Figs. 7 and 8 are elevations at right angles, partly in section showing a slightly modified arrangement of renewable tread ring.

Fig. 9 is a part end elevation and part transverse section taken through different planes bounded by the radial lines, and Fig. 10 is a sectional side elevation of a piston fitted with a slightly modified form of packing.

Figs. 11 and 12, 13 and 14, 15 and 16, 17 and 18, 18$^a$, 19, and 20 illustrate in similar views to those preceding, slightly modified arrangements of packing.

Figs. 21 to 24 illustrate in transverse section and sectional side elevation the improved application of the expanding springs to the packing.

In the form of the invention illustrated in Figs. 1 to 6 the pressure medium acts directly on the side of the packing ring $a$, which is of the segmental type with expanding wedges $b$, and springs $c$ at the joints. It will be seen that the groove $d$ formed in the piston body $e$ for the reception of the ring is so much greater in width than the ring $a$ that a space $f$ is left between the ring and one side of the groove in which it is mounted, enabling the pressure medium to enter freely and act on the whole area of the ring on one side, forcing the ring tightly against the opposite side of its groove, and counteracting the radial expanding action of that portion of the pressure medium which gets between the packing ring and the bottom of its groove, and acts on the unbalanced internal area of the ring. The surfaces exposed to the pressure medium may be varied either by deepening the ring or by reducing the width of the rubbing face on the cylinder, but the depth should be about five to eight times the said width when a follower ring is not employed. Helical springs $g$ are inserted in the groove to keep the ring in close contact with one side of the groove. The rings are pressed by the springs $g$ in opposite directions as shown in Fig. 2 or in the same direction as shown in Fig. $2^a$ according to the working conditions to get the best results.

These springs are conveniently inclosed for protection in metal cups $h$, which are positioned in recesses formed in the packing ring, such recesses having central pegs or projections $l$ on which the end coils of the springs are fixed, thus preventing them from falling out when the ring is removed. In place of the helical springs $g$ integral projections $g'$ formed on the packing ring segments may be employed as shown in Fig. $4^a$, or wavy-springs may be used.

Figs. 1 and 2, and $1^a$, $2^a$ show the packing rings fitted in grooves cut in a piston cast in one piece.

Figs. 3 and 4 show a method of fitting them to a piston or valve $e$, having a loose junk plate $e'$ the intermediate space being filled up with suitable distance pieces $j$.

In Figs. $1^b$ and $2^b$ the packing rings $a$ are slotted and mounted on guide studs $a'$ screwed into a fixed tread ring $e^3$ whose outer faces project beyond the body $e$ and junk ring $e'$ forming seats for the packing rings $a$ which are forced against the ring $e^3$ by springs $g$ mounted in metal cups $h$ which in this case are formed as nuts, and screw on to the studs $a'$. It will be seen that the pressure medium has free access to one side of the packing ring, and forces it against the ring $e^3$ to counteract the radial expanding action of the pressure medium as before described.

Figs. 5 and 6 show a piston specially suitable for locomotive work. The piston head $e$ is cast with a large annular groove $e^2$ for the reception of the renewable tread ring $e^3$ and packing rings $a$, the tread ring $e^3$ being mounted between the packing rings $a$, and made in two substantial semi-circular parts, having oppositely reduced ends $e^4$ joined together when in position by pins $e^5$ adapted to be partly withdrawn to release the ring by means of a screwed stud inserted through a hole in the flanges or junks which hold the packing and tread in position on the head, or alternatively the pins may be driven out by a punch, introduced through the hole $k$ shown in dotted lines. Instead of forming the tread ring $e^3$ with halved together ends the ends may be made to abut as shown in Fig. 8, and recessed on one side to receive a jointing plate $e^7$ secured by two pins $e^5$ at each joint. The pins are retained in their holes by the packing rings and cannot come out accidentally, filling plugs such as $e^6$ being inserted where required between the packing ring $a$ and pins $e^5$.

In another form of the invention illustrated in Figs. 7 to 16 a non-expanding follower ring $m$ is mounted in the packing ring groove $d$, and is normally pressed against the packing ring $a$ by springs $g$. The width of the groove is such that the pressure medium can pass freely down the side of the follower ring, and thus forces this ring up tightly against the packing ring, causing the packing ring segments to be gripped and prevented from being expanded radially by the action of the pressure medium.

By the use of the ring $m$ the grip on the packing ring is increased, enabling a shallower ring to be used, or one with more surface in contact with the cylinder. It will of course be understood that the proper expansion of the packing rings by their expanding springs $c$ is not interfered with, the rings being smaller than the recesses or channels in which they are disposed so as to permit the pressure medium to substantially act upon all of their surfaces, thus leaving the springs free to apply the required packing pressure to the rings.

When non-expanding follower rings $m$ are employed on solid piston heads they are formed in two or more parts or segments to enable them to be placed in the grooves.

In Fig. 7 a suitable joint for connecting the parts of the follower or clamping ring is shown consisting of dovetail or similar tongues $m'$ on one half of the ring engaging in corresponding recesses in the other half. The joint may be made in various other ways.

In Figs. 13 and 14 a jointing plate o is employed, having pins o' which enter holes in the follower ring. A third pin o² screwed into the plate o extends through the follower ring into a radial guide groove in the piston and prevents the ring from turning. Instead of joining the parts of the ring m together, however, they may, as shown in Figs. 9 and 10 be left independent and guided axially by guide pins m² which are screwed into the follower segments and extend into guide openings m³, in the flanges of the piston.

Leaf springs n can be conveniently fixed on the guide pins m² for maintaining the follower ring and packing ring against one side of the groove. Where the pistons have removable junk rings, as shown in Figs. 12 and 16 the follower rings can each be in one piece.

The packing rings are usually made comparatively wide in section, but as it is desirable to reduce the parts in contact with the cylinder wall, the rings are grooved, as shown in Figs. 9 to 12, and 15 to 20, or a portion removed near the outer edge, as shown in other figures, the grooves preferably communicating with the side or bottom of the seating groove in the piston body by radial holes p, some of which may be screw threaded to receive threaded rods for lifting the parts. Tapped holes may also be provided in the wedges b for the same purpose.

When a narrow packing ring is employed, as in Figs. 7, 8, and 13, 14, a curved leaf spring c' is employed for expanding the packing. This spring has an integral bulb or head c² formed thereon, which is adapted to fit into a recess in the expanding wedge or choke b of the packing. The bulb or head c² of the spring has sometimes a pin or projection c³ formed on the side which is intended to engage in a groove c⁴ in the adjacent follower ring, to prevent the packing rings from rotating, and thus maintain the joints of adjacent rings in the desired relative positions.

Figs. 17 to 20 illustrate a further modification of the packing which is especially suitable where sufficient depth is not available for the previous arrangements. The rings a in this case are kept by springs, or other suitable means over to the outer sides of the grooves, thus keeping that face steam-tight, and excluding the steam from the under side of the rings.

Fig. 18 shows the rings a in separate grooves and Fig. 18ᵃ is a view of two packing rings arranged in the same groove. In both cases they are fitted to a piston or valve having a loose junk, the intervening space being made up by suitable carrier rings.

The rings are prevented from creeping by a pin s driven tightly into one choke, and fitting into a hole s' in the carrier ring t.

Figs. 19 and 20 show a form of this ring fitted to a piston cast in one piece and grooved, the rings being prevented from working around in the grooves by a segmental seal piece b' formed on the choke or wedge fitting into a corresponding groove in the side of the ring groove.

As shown in Figs. 21 to 24 the packing ring a whether formed in segments, (Fig. 21) or in one piece with a single joint, (Fig. 23) is recessed at intervals on one side to receive helical springs g³ such recesses being formed with central pegs or projections l as already described in connection with the springs g on which the end coils of the springs are fixed. The recesses are made obliquely in relation to the axis of the ring, and the springs g³ which are inclosed in metal cups h, also take up corresponding positions when in their recesses, and bear against the adjacent side of the packing ring groove which is suitably inclined, so that the axes of the oblique recesses and springs are normal thereto.

The wedges or chokes b in the joints of the rings are also recessed to receive expanding springs in the same manner as the rings.

In order to prevent the packing rings from rotating in their grooves one or more of the cups h containing the springs may be arranged to engage a radial recess h' in the side of the packing ring groove.

What I claim and desire to secure by Letters Patent is:—

1. The combination with a piston having a packing seat, of a packing ring mounted in said seat, passage means being provided to allow the pressure fluid to exert a thrust on said ring in a direction to force the same against one side of the seat and an additional thrust outwardly on said ring, the radial area of the ring being sufficiently greater than its axial area to cause the friction of said ring against said side to neutralize the outward thrust of the pressure fluid on said ring whereby the pressure fluid is prevented from shifting the ring outwardly against the cylinder, and means independent of the pressure fluid, for holding the ring against said side of the seat and also for retaining the ring against the cylinder wall with a predetermined amount of friction.

2. The combination with a piston having a packing seat, of a packing ring mounted in said seat, the area of one radial side of said ring being sufficiently greater than the area of the inner peripheral edge thereof to permit the pressure fluid which is beside and behind the ring to act on the above mentioned side of the latter and force the opposite radial side thereof against the opposed side wall of the said seat and thus neutralize the tendency of the fluid to expand the ring radially, and means independent of the pressure fluid, for holding said ring against one side wall of the seat and also for expanding the packing ring.

3. The combination with a piston having a packing seat, of a packing ring formed of pressure-balanced segments mounted in said seat, the area of one radial side of said ring being sufficiently greater than the area of the inner peripheral edge thereof to permit the pressure fluid which is beside and behind the ring to act on the above mentioned side of the latter and force the opposite radial side thereof against the opposed side wall of said seat and thus neutralize the tendency of the fluid to expand the ring radially, and means, independent of the pressure fluid, for holding said ring against one side wall of the seat and also for expanding the packing ring.

4. The combination with a piston having a packing groove therein, of a segmental packing ring mounted in said groove, the area of one radial side of said ring being sufficiently greater than the area of the inner peripheral edge thereof to permit the pressure fluid which is beside and behind the ring to act on the above mentioned side of the latter and force the opposite side thereof against the opposed side wall of the said seat and thus neutralize the tendency of the fluid to expand the ring radially, and wedges arranged at the ends of the segments of said ring and adapted to expand the ring, and means independent of the pressure fluid, for holding said ring against one side wall of the seat and also for forcing said wedges outwardly to expand the ring.

5. The combination with a piston having a peripheral seat therein, of a ring in said seat, said ring being of less axial width than the axial width of said seat, the radial area of the ring being greater than its axial area, and means for holding one radial face of said ring in contact with the adjacent side wall of said seat and for holding its opposite face away from the other side wall of the seat and thus permit the pressure fluid to act against one radial face of the ring and exclude the pressure fluid from the opposite radial face of the ring, whereby the friction of the ring against one side of the seat will neutralize the outward thrust of the pressure fluid on said ring.

6. The combination with a piston having a peripheral seat therein, of a ring in said seat, said ring being of less axial width than the axial width of said seat, means for holding one radial face of said ring in contact with the adjacent side wall of said seat and for holding its opposite face away from the other side wall of the seat and thus permit the pressure fluid to act against one radial face of the ring and exclude the pressure fluid from the opposite radial face of the ring, the axial area of said ring being less than the radial area thereof, whereby the friction which is produced between the contacting faces of the ring and seat by the force of the pressure fluid exerted on the radial face of said ring counterbalances the pressure of said fluid on the inner axial face of the ring, and means independent of the first said means for exerting an expanding force against the ring.

7. The combination with a piston having a peripheral seat therein, of a ring in said seat, said ring being of less axial width than the width of said seat, the radial width of the ring being greater than its axial width, means for holding one radial face of said ring in contact with the adjacent side wall of said seat and for holding its other radial face away from the other side wall of the seat and thus permitting the pressure fluid to flow between said other face of the said ring and said other side wall of the said seat and exert its pressure against one radial face of the ring, the radial width of said ring being from five to seven times greater than the outer peripheral or rubbing width thereof so that the friction between the contacting surface of the ring and seat, caused by the pressure of the pressure medium on the other radial face of the ring, counterbalances the radial pressure of the pressure medium against the inner peripheral face of the ring.

8. The combination with a piston having a packing seat; of a packing ring mounted in said seat and formed with an even flat face, means for holding the packing ring with said even flat face against a corresponding side wall of said seat and for expanding the ring consisting of springs mounted obliquely between one side wall of said seat and said ring whereby the force exerted by said springs is divided into radial and axial components, and means for permitting the pressure fluid to neutralize its own expanding force behind the ring.

9. The combination with a piston having a packing seat; of a packing ring mounted in said seat and formed with an even flat face, means for permitting the pressure fluid to neutralize its own expanding force behind the ring, and means for exerting a radial and an axial pressure on said ring, for simultaneously expanding said ring and holding said even flat face of the same against one side wall of its seat.

10. The combination with a piston having a packing seat; of a packing ring mounted in said seat, said ring having obliquely disposed recesses in one side thereof while its opposite side is formed with an even flat face, springs mounted in said recesses, the side wall of said seat adjacent the recessed side of said packing ring being inclined at an angle, and means whereby the pressure fluid is caused to neutralize its expanding force upon the ring.

11. The combination with a piston having a packing seat; of a packing ring mounted in said seat and divided into segments, wedges at the joints of said ring, springs mounted to expand the segments and simultaneously force them against one side wall of their seat in the piston, and means whereby the pressure fluid is caused to neutralize its expanding force upon the ring.

In testimony whereof I have affixed my signature, in presence of two witnesses.

ROBERT ALLEN.

Witnesses:
ALBERT JONES,
RICHARD P. CLARK.